(12) United States Patent
Xu

(10) Patent No.: US 10,678,427 B2
(45) Date of Patent: Jun. 9, 2020

(54) MEDIA FILE PROCESSING METHOD AND TERMINAL

(71) Applicant: Huawei Technologies Co., Ltd., Shenzhen (CN)

(72) Inventor: Jie Xu, Shanghai (CN)

(73) Assignee: Huawei Technologies Co., Ltd., Shenzhen (CN)

( * ) Notice: Subject to any disclaimer, the term of this patent is extended or adjusted under 35 U.S.C. 154(b) by 236 days.

(21) Appl. No.: 15/442,385

(22) Filed: Feb. 24, 2017

(65) Prior Publication Data

US 2017/0160921 A1 Jun. 8, 2017

Related U.S. Application Data

(63) Continuation of application No. PCT/CN2014/085152, filed on Aug. 26, 2014.

(51) Int. Cl.
*G06F 3/0488* (2013.01)
*G06F 3/0484* (2013.01)
*G10H 1/00* (2006.01)

(52) U.S. Cl.
CPC ...... *G06F 3/04883* (2013.01); *G06F 3/04842* (2013.01); *G06F 3/04847* (2013.01); *G10H 1/0008* (2013.01); *G10H 2220/011* (2013.01); *G10H 2220/106* (2013.01); *G10H 2220/201* (2013.01); *G10H 2220/391* (2013.01); *G10H 2220/395* (2013.01)

(58) Field of Classification Search
CPC ............. G06F 3/04842; G06F 3/04883; G06F 3/04847; G10H 1/0008
See application file for complete search history.

(56) References Cited

U.S. PATENT DOCUMENTS 5,999,173 A * 12/1999 Ubillos ................ G11B 27/034
348/E5.056
8,448,083 B1 5/2013 Migos et al.
(Continued)

FOREIGN PATENT DOCUMENTS

CN  1648844 A    8/2005
CN  101131693 A  2/2008
(Continued)

OTHER PUBLICATIONS

Bennet, "How to Use Parts of Songs from MP3 Files in PowerPoint," XP055389806A, Internet Archive Wayback Machine (Downloaded Nov. 7, 2017).

*Primary Examiner* — Li P Sun
(74) *Attorney, Agent, or Firm* — Leydig, Voit Mayer, Ltd.

(57) ABSTRACT

The present invention provides a method, including: displaying text information, where the text information is associated with the media file; receiving a first gesture and displaying time information, where the time information is associated with a part that is selected by using the first gesture and of the text information; and receiving a second gesture and acquiring a segment that is confirmed by using the second gesture and of the media file. By using the displayed text information, the displayed time information, and the acquired segment that is confirmed by using the second gesture and of the media file, a terminal does not need to install other processing software to implement processing of a gesture.

17 Claims, 11 Drawing Sheets

(56) References Cited

U.S. PATENT DOCUMENTS

| | | | |
|---|---|---|---|
| 8,492,637 B2 | 7/2013 | Miyajima | |
| 8,533,598 B2 | 9/2013 | Meaney et al. | |
| 8,604,327 B2 | 12/2013 | Takeda | |
| 9,176,658 B1* | 11/2015 | Latin-Stoermer | G06F 3/0485 |
| 2002/0167541 A1* | 11/2002 | Ando | G11B 27/034 |
| | | | 715/723 |
| 2003/0196167 A1* | 10/2003 | Dewar | G06Q 10/04 |
| | | | 715/223 |
| 2004/0266337 A1* | 12/2004 | Radcliffe | G10H 1/0008 |
| | | | 455/3.06 |
| 2006/0194626 A1 | 8/2006 | Anttila | |
| 2007/0261537 A1 | 11/2007 | Eronen et al. | |
| 2008/0126314 A1 | 5/2008 | Thorn | |
| 2009/0177966 A1 | 7/2009 | Chaudhri | |
| 2010/0082768 A1 | 4/2010 | Edwards et al. | |
| 2010/0312596 A1 | 12/2010 | Saffari et al. | |
| 2012/0022854 A1 | 1/2012 | Hoshino et al. | |
| 2012/0197628 A1* | 8/2012 | Best | G06F 17/273 |
| | | | 704/2 |
| 2012/0221975 A1* | 8/2012 | Juristovski | G10H 1/365 |
| | | | 715/823 |
| 2012/0259634 A1 | 10/2012 | Tsunokawa | |
| 2012/0304092 A1 | 11/2012 | Jarrett et al. | |
| 2013/0006627 A1 | 1/2013 | Guthery et al. | |
| 2014/0136969 A1 | 5/2014 | Horiuchi et al. | |
| 2014/0149861 A1 | 5/2014 | Shih et al. | |
| 2014/0163963 A2 | 6/2014 | Dahlmeier et al. | |
| 2014/0207797 A1 | 7/2014 | Davies | |
| 2015/0277748 A1 | 10/2015 | Shin | |
| 2016/0164811 A1* | 6/2016 | Guthery | G10L 15/26 |
| | | | 705/14.69 |

FOREIGN PATENT DOCUMENTS

| | | |
|---|---|---|
| CN | 101763880 A | 6/2010 |
| CN | 102568482 A | 7/2012 |
| CN | 102568527 A | 7/2012 |
| CN | 102737676 A | 10/2012 |
| CN | 103154936 A | 6/2013 |
| CN | 103345931 A | 10/2013 |
| CN | 103593335 A | 2/2014 |
| CN | 103686250 A | 3/2014 |
| CN | 103703465 A | 4/2014 |
| CN | 103839565 A | 6/2014 |
| CN | 104361897 A | 2/2015 |
| EP | 1526442 B1 | 7/2018 |
| JP | H08137876 A | 5/1996 |
| JP | H08306168 A | 11/1996 |
| JP | 2001101204 A | 4/2001 |
| JP | 2002318580 A | 10/2002 |
| JP | 2005100415 A | 4/2005 |
| JP | 2005100541 A | 4/2005 |
| JP | 2009175739 A | 8/2009 |
| JP | 2009253305 A | 10/2009 |
| JP | 4449118 B2 | 4/2010 |
| JP | 2012027724 A | 2/2012 |
| JP | 2012529685 A | 11/2012 |
| JP | 2013045131 A | 3/2013 |
| JP | 2013240024 A | 11/2013 |
| JP | 2014026232 A | 2/2014 |
| JP | 2014099052 A | 5/2014 |
| KR | 20110127442 A | 11/2011 |
| KR | 20130114527 A | 10/2013 |
| KR | 101329584 B1 | 11/2013 |
| RU | 2407211 C2 | 12/2010 |

* cited by examiner

MEDIA FILE PROCESSING METHOD AND TERMINAL

CROSS-REFERENCE TO RELATED APPLICATIONS

This application is a continuation of International Application No. PCT/CN2014/085152, filed on Aug. 26, 2014, the disclosure of which is hereby incorporated by reference in its entirety.

TECHNICAL FIELD

The present invention relates to the field of mobile communications, and in particular, to a media file processing method and terminal.

BACKGROUND

Currently, a user usually plays a media file by using a mobile terminal. When the user hears a favorite media file and needs to process a segment of the favorite media file, the user needs to process the media file by using another media file processing tool.

However, when processing the media file by using the another media file processing tool, the user needs to listen to the media file multiple times, and record a start moment and an end moment of a favorite segment in the media file. When a user processes a media file by using such a method, other processing software needs to be installed on a mobile terminal, which occupies a central processing unit (CPU) resource and a memory resource of the mobile terminal, and affects processing efficiency and a processing speed of the mobile terminal. In addition, the user needs to listen to the media file multiple times and record a play moment of the media file that needs to be processed. Therefore, steps are trivial, and user experience is poor.

SUMMARY

Embodiments of the present invention provide a media file processing method and terminal that improves processing efficiency and user experience.

According to a first aspect of the present invention, a media file processing terminal is provided, where the terminal includes an input apparatus, a display apparatus, and a processor, where the display apparatus is configured to: display text information, where the text information is associated with the media file; and display time information; the input apparatus is configured to receive a first gesture, where a part of the displayed text information is selected by using the first gesture, and the part that is selected by using the first gesture and of the text information is associated with the time information; the input apparatus is further configured to receive a second gesture, where a segment of the media file is confirmed by using the second gesture, and play duration of the segment is associated with the displayed time information; and the processor is configured to acquire the segment that is confirmed by using the second gesture and of the media file.

In a first possible implementation manner, after the input apparatus receives the first gesture, the processor determines whether the part that is selected by using the first gesture and of the text information conforms to a preset syntax rule.

With reference to the first aspect, in a second possible implementation manner, the display apparatus displays recommended information if the part that is selected by using the first gesture and of the text information does not conform to the preset syntax rule, where the recommended information is text information that conforms to the preset syntax rule.

With reference to the first method and either of the foregoing possible implementation manners, the display apparatus displays a sharing option after the processor acquires the segment that is confirmed by using the second gesture and of the media file, where the sharing option responds to a third gesture, so that the acquired segment of the media file is shared.

With reference to the first method and any one of the foregoing possible implementation manners, before the second gesture is received, the processor pre-plays the segment that is associated with the displayed time information and of the media file.

With reference to the first method and any one of the foregoing possible implementation manners, before the second gesture is received, the display apparatus displays a fine adjustment option, where the fine adjustment option provides an option of fine adjusting the part that is selected by using the first gesture and of the text information, or the fine adjustment option provides an option of fine adjusting the displayed time information.

With reference to the first method and any one of the foregoing possible implementation manners, that the processor acquires the segment that is confirmed by using the second gesture and of the media file specifically includes: the processor captures the segment that is confirmed by using the second gesture and of the media file, and saves the captured segment to a preset save path.

According to a second aspect, a media file processing method is provided, including: displaying text information, where the text information is associated with the media file; receiving a first gesture, where a part of the displayed text information is selected by using the first gesture; displaying time information, where the time information is associated with the part that is selected by using the first gesture and of the text information; receiving a second gesture, where a segment of the media file is confirmed by using the second gesture, and play duration of the segment is associated with the displayed time information; and acquiring the segment that is confirmed by using the second gesture and of the media file.

In a first possible implementation manner, the method further includes: after the first gesture is received, determining whether the part that is selected by using the first gesture and of the text information conforms to a preset syntax rule.

In a second possible implementation manner, the method further includes: displaying recommended information if the part that is selected by using the first gesture and of the text information does not conform to the preset syntax rule, where the recommended information is text information that conforms to the preset syntax rule.

With reference to the second aspect and either of the foregoing possible implementation manners, the method further includes: displaying a sharing option after the segment that is confirmed by using the second gesture and of the media file is acquired, where the sharing option responds to a third gesture, so that the acquired segment of the media file is shared.

With reference to the second aspect and any one of the foregoing possible implementation manners, the method further includes: before the second gesture is received, displaying a fine adjustment option, where the fine adjustment option provides an option of fine adjusting the part that is selected by using the first gesture and of the text information, or the fine adjustment option provides an option of fine adjusting the displayed time information.

With reference to the second aspect and any one of the foregoing possible implementation manners, the acquiring the segment that is confirmed by using the second gesture and of the media file is specifically: capturing the segment that is confirmed by using the second gesture and of the media file; and saving the captured segment to a preset save path.

According to a third aspect, a graphical user interface on a mobile terminal device is provided, where the graphical user interface is configured to: display text information, where the text information is associated with the media file; display a first interface in response to a first gesture, where the first interface displays time information and a part that is selected by using the first gesture and of the text information, and the time information is associated with the part that is selected by using the first gesture and of the text information; and display a second interface in response to a second gesture, where the second interface displays an acquired segment that is confirmed by using the second gesture and of the media file.

In a first possible implementation manner, recommended information is displayed on the displayed first interface, where the recommended information is text information that conforms to the preset syntax rule.

With reference to the third aspect and the first possible implementation manner, a sharing option is displayed on the displayed second interface, where the sharing option responds to a third gesture, so that the acquired segment of the media file is shared.

With reference to the third aspect and either of the foregoing possible implementation manners, a fine adjustment option is further displayed on the displayed first interface, where the fine adjustment option provides an option of fine adjusting the part that is selected by using the first gesture and of the text information, or the fine adjustment option provides an option of fine adjusting the displayed time information.

According to a fourth aspect, a graphical user interface on a mobile terminal device is provided, including: the graphical user interface includes a media file processing interface; and the media file processing interface includes: a first area that displays text information, a second area that displays a selected part of the text information, and a third area that displays time information, where text information that is associated with the media file is displayed in the first area of the text information; in response to a received first gesture, the second area of the selected part of the text information is displayed, where the part of the text information displayed in the first area of the text information is selected by using the first gesture; the time information that is associated with the part that is selected by using the first gesture and of the text information is displayed in the third area that displays the time information; and in response to a received second gesture, a segment that is confirmed by using the second gesture and of the media file is acquired, where the segment of the media file is confirmed by using the second gesture, and play duration of the segment is associated with the displayed time information.

In a first possible implementation manner, the graphical user interface further includes a fourth area that displays text information different from the selected part of the text information, recommended information is displayed in the fourth area that is different from the selected part of the text information, and the recommended information is text information that conforms to the preset syntax rule.

With reference to the fourth aspect and the first possible implementation manner, the graphical user interface further includes a sharing option, where the sharing option responds to a third gesture, so that the acquired segment of the media file is shared.

With reference to the fourth aspect and either of the foregoing possible implementation manners, a fine adjustment option is displayed, where the fine adjustment option provides an option of fine adjusting the part that is selected by using the first gesture and of the text information, or the fine adjustment option provides an option of fine adjusting the displayed time information.

It can be learned from the foregoing technical solutions that the embodiments of the present invention have the following advantages:

When a media file is processed by using a mobile terminal, efficiency in processing the media file is improved, and processing steps of a user are reduced, thereby improving user experience.

BRIEF DESCRIPTION OF DRAWINGS

To describe the technical solutions in the embodiments of the present invention more clearly, the following briefly describes the accompanying drawings for describing the embodiments. The accompanying drawings in the following description show merely some embodiments of the present invention, and persons skilled in the art may still derive other drawings from these accompanying drawings.

DESCRIPTION OF EMBODIMENTS

The following describes the technical solutions in the embodiments of the present invention with reference to the accompanying drawings in the embodiments of the present invention. The described embodiments are merely some but not all of the embodiments of the present invention. All other embodiments obtained by persons skilled in the art based on the embodiments of the present invention shall fall within the protection scope of the present invention.

The embodiments of the present invention provide a media file processing method. In the present invention, an involved mobile terminal may be a mobile device such as a smartphone or a tablet computer, and an involved gesture of a user may be various gestures of the user, may be a gesture of pressing a physical button by the user, or may be a gesture of, for example, shaking a mobile phone by the user.

Figure 1:
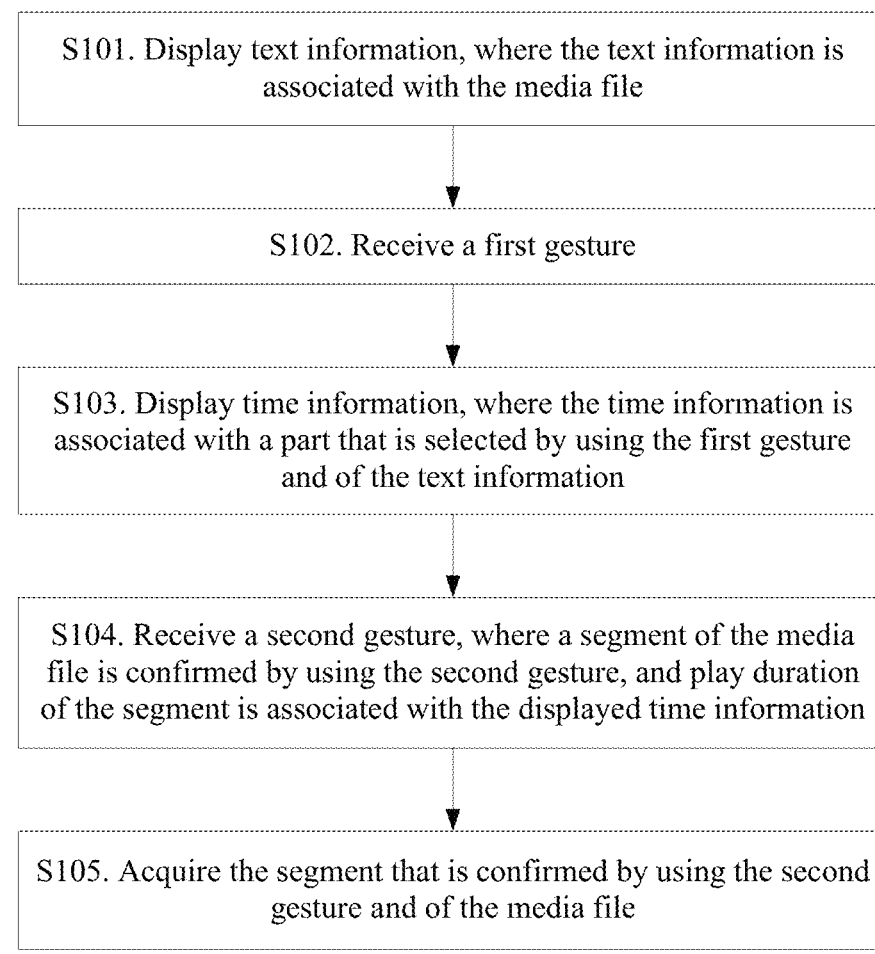
FIG. 1 is a flowchart of a media file processing method according to an embodiment of the present invention.

FIG. 1 is a flowchart of a media file processing method according to an embodiment of the present invention. As shown in FIG. 1, the method includes the following steps:

S101. Display text information, where the text information is associated with the media file.

The text information may be lyrics of playing music or subtitles of a playing video. The media file may be music or a video.

When a user plays music by using a mobile terminal, lyrics of the played music are displayed on a display screen of the mobile terminal. The played music is associated with the lyrics of the music.

S102. Receive a first gesture.

The first gesture is selecting, by the user, a part of the text information displayed on the display screen of the mobile terminal, where the first gesture may be a long press gesture, a slide gesture, a pinch gesture, or the like.

S103. Display time information, where the time information is associated with a part that is selected by using the first gesture and of the text information.

After the first gesture is received, the time information is displayed in response to the first gesture. The time information may be a time period corresponding to text information selected by using the first gesture, or a start time point and an end time point that are of text information selected by using the first gesture.

S104. Receive a second gesture, where a segment of the media file is confirmed by using the second gesture, and play duration of the segment is associated with the displayed time information.

The second gesture may be a long press gesture, a slide gesture, a pinch gesture, or the like.

S105. Acquire the segment that is confirmed by using the second gesture and of the media file.

The acquiring the segment that is confirmed by using the second gesture and of the media file specifically includes: capturing the segment that is confirmed by using the second gesture and of the media file; and saving the captured segment to a preset save path.

In this embodiment of the present invention, the first gesture or the second gesture may further be another gesture that is sensed by using a sensor, or the like, which is not specifically limited in this embodiment.

In this embodiment, a user selects, according to text information displayed on a display screen of a mobile terminal, a part of the displayed text information; time information of the selected part of the text information is displayed on the mobile terminal; and the user confirms an acquired segment of a media file according to the displayed time information. According to the method, media file processing may be completed within a shortest time according to a requirement and interest of the user, which avoids a problem of installing other processing software on the mobile terminal and of having difficulty in processing, reduces CPU resource occupation and memory occupation of the mobile terminal, and improves processing efficiency and a processing speed of the mobile terminal, thereby providing better user experience for the user.

Figure 2:
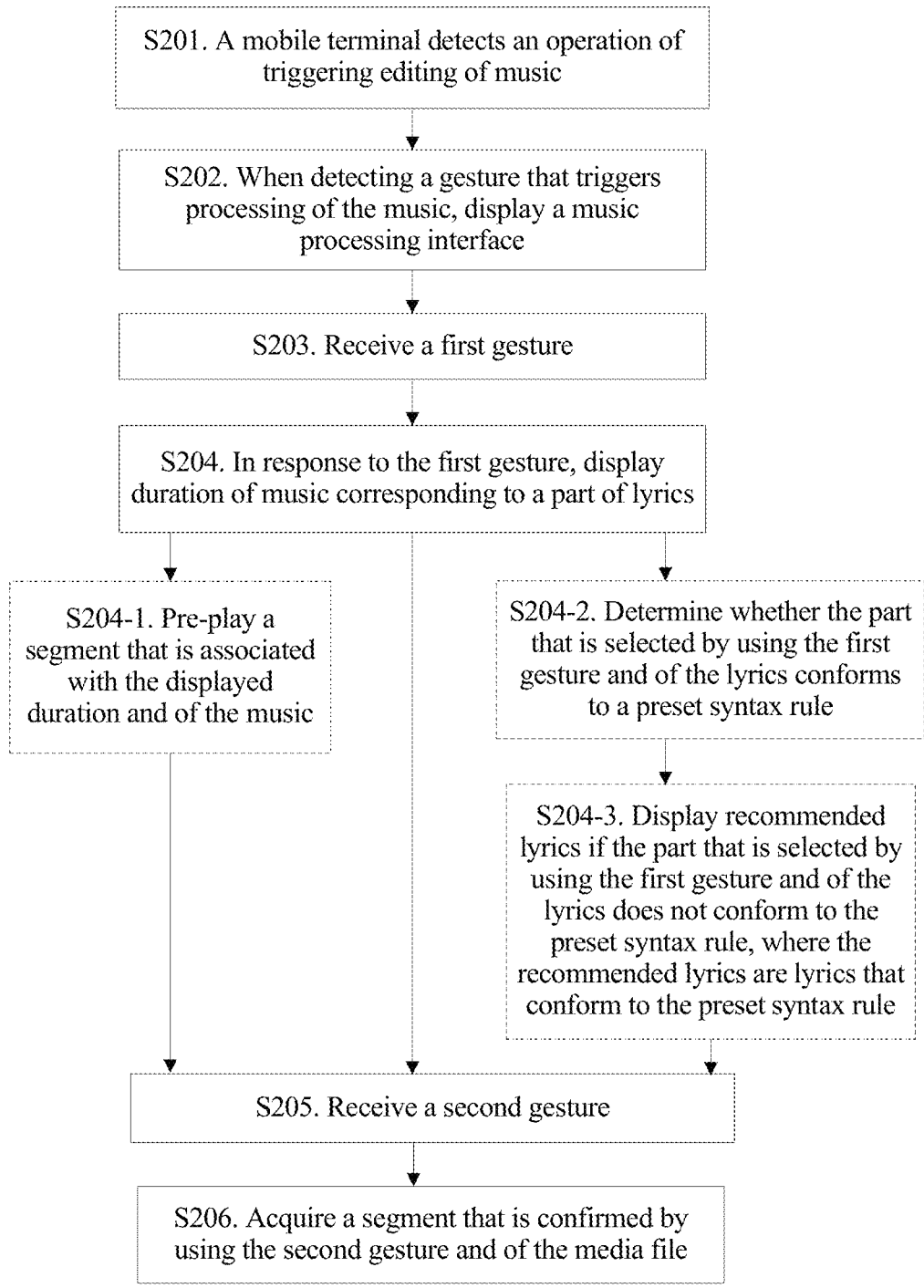
FIG. 2 is a flowchart of a media file processing method according to another embodiment of the present invention.

FIG. 2 is a flowchart of a media file processing method according to another embodiment of the present invention. In this embodiment, an example is used in which a media file is music and text information is lyrics of the music. As shown in FIG. 2, the method includes the following steps:

S201. A mobile terminal detects a gesture that triggers processing of music.

Figure 3A:
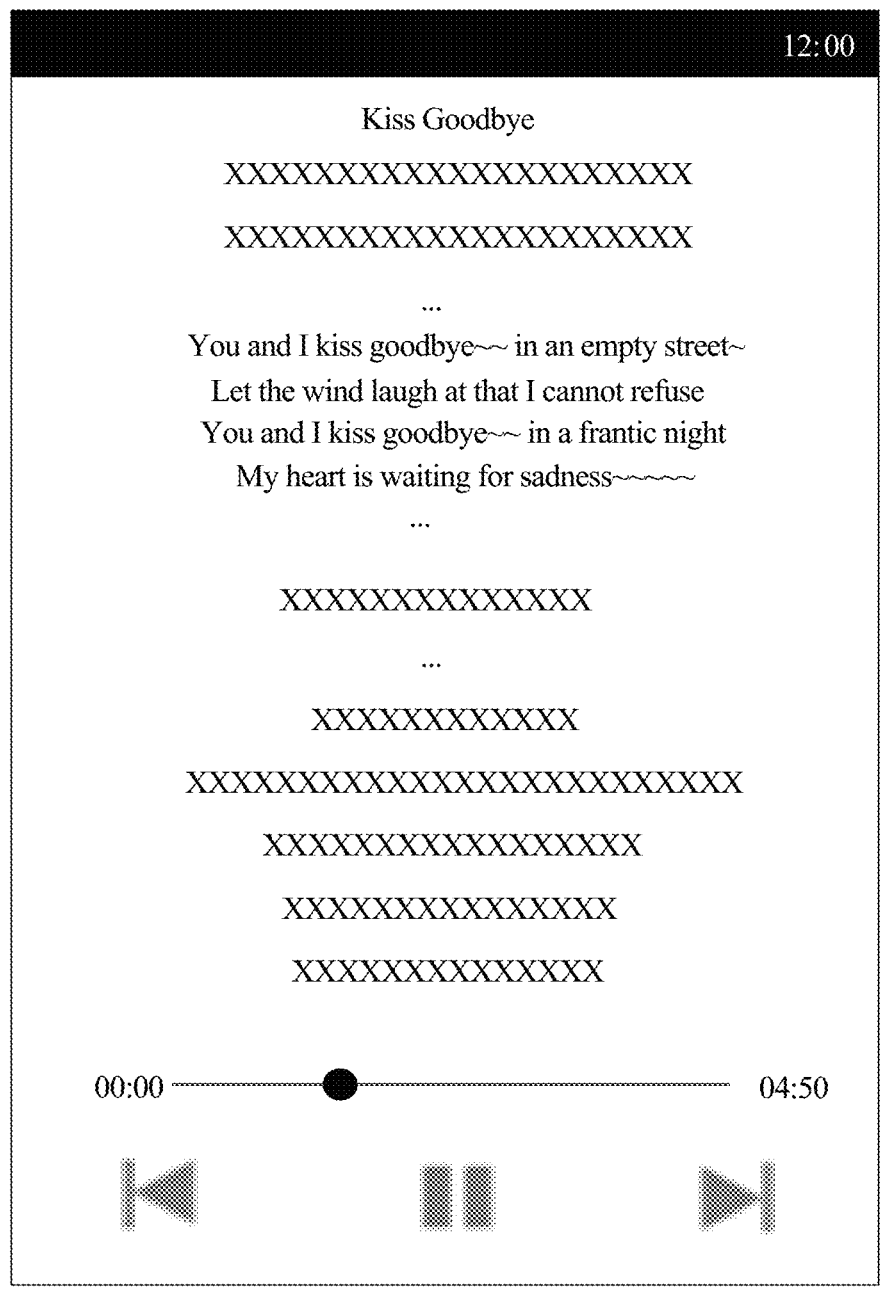
FIG. 3A to FIG. 3C are schematic diagrams of cases of processing a media file according to an embodiment of the present invention.

As shown in FIG. 3A, FIG. 3A is a diagram of an interface in which the mobile terminal is playing the music. An entire play time from 00:00 to 04:50 of currently played music Kiss Goodbye, a current play position, and currently played lyrics are displayed on a display screen of the mobile terminal. The display screen of the mobile terminal may be a touchscreen, and the touchscreen may be used as in input device. When the touchscreen receives a gesture of a user, the mobile terminal detects whether the gesture of the user is a gesture that triggers processing of the music. The gesture that triggers processing of the music may be a long press gesture, or a predefined gesture such as a gesture that is predefined according to a nine-square grid input method.

S202. When detecting the gesture that triggers processing of the music, display a music processing interface.

Figure 3B:
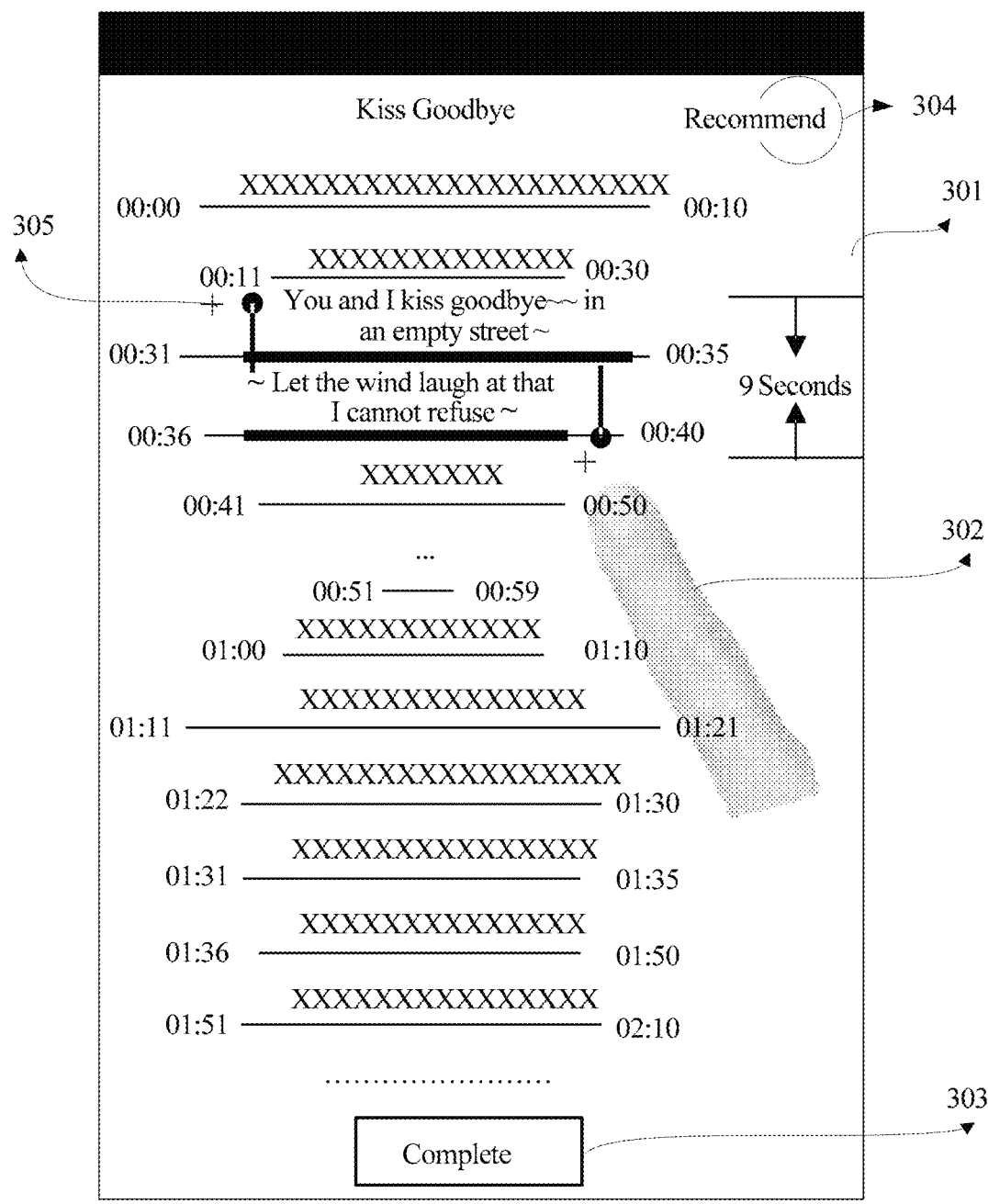

When detecting that the gesture of the user is the gesture that triggers processing of the music, the mobile terminal displays the music processing interface on the display screen of the mobile terminal. As shown in FIG. 3B, when the gesture that triggers processing of the music is detected, a music processing interface 301 is displayed, and lyrics of currently played music are displayed on the processing interface 301.

S203. Receive a first gesture.

In another embodiment of the present invention, before the mobile terminal receives the first gesture, the mobile terminal establishes an association relationship for the music, the lyrics, and a time for playing the music.

The user selects, according to the music processing interface displayed on the display screen of the mobile terminal, a part of the lyrics displayed on the interface, where the first gesture may be a long press gesture, a slide gesture, or a pinch gesture. As shown in FIG. 3B, the user selects the part of the lyrics by using a long press gesture 302.

S204. In response to the first gesture, display duration of music corresponding to a part of lyrics.

After the part of the lyrics is selected by using the first gesture, the duration of the music corresponding to the part of the lyrics is displayed on the display screen of the mobile terminal. As shown in FIG. 3B, music whose song title is Kiss Goodbye is used as an example. A part of lyrics "You and I kiss goodbye~~ in an empty street~ Let the wind laugh at that I cannot refuse" is selected by using the long press gesture 302 of the user, and duration corresponding to the part of the lyrics is displayed on the processing interface 301. The displayed duration corresponding to the part of the lyrics includes the following cases. For example, a start time 00:31 and an end time 00:35 of "You and I kiss goodbye~~ in an empty street~" are displayed, a start time 00:36 and an end time 00:40 of "Let the wind laugh at that I cannot refuse" are displayed at the same time, and total duration of 9 seconds of "You and I kiss goodbye~~ in an empty street~ Let the wind laugh at that I cannot refuse" is further displayed. Optionally, only the total duration of 9 seconds of "You and I kiss goodbye~~ in an empty street~ Let the wind laugh at that I cannot refuse" may be displayed, only the start time 00:31 and the end time 00:40 of "You and I kiss goodbye~~ in an empty street~ Let the wind laugh at that I cannot refuse" may be displayed, or the start time 00:31 and the end time 00:35 of "You and I kiss goodbye~~ in an empty street~" may be displayed, and the start time 00:36 and the end time 00:40 of "Let the wind laugh at that I cannot refuse" are displayed at the same time.

In another embodiment of the present invention, as shown in FIG. 3B, when the selected part of the lyrics is displayed on a display interface 301, a fine adjustment option 305 may be displayed, where the fine adjustment option 305 may provide the user with a fine adjustment option of lyrics selection, or may provide the user with an option of fine adjusting the displayed time information, or may provide options of fine adjusting the lyrics and the time at the same time. For example, when the user thinks that the only 9-second duration corresponding to the selected lyrics "You and I kiss goodbye~~ in an empty street~ Let the wind laugh at that I cannot refuse" is too short, the user may adjust, by using a symbol "+" in the fine adjustment option 305, the lyrics selected by the user. When thinking that the selected lyrics are too long, the user may adjust, by using a symbol "~" in the fine adjustment option 305, the favorite lyrics selected by the user.

Figure 3C:
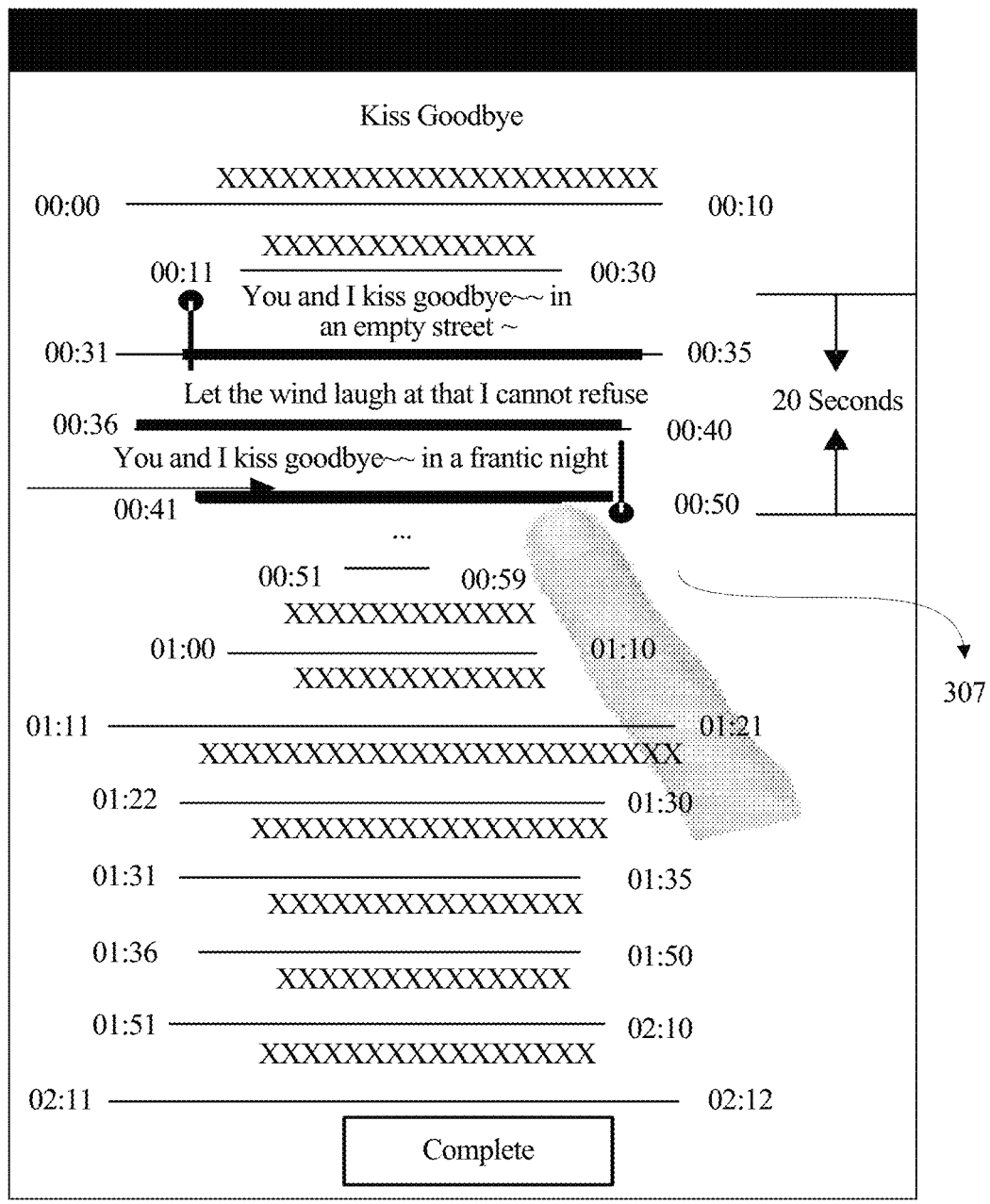

Optionally, as shown in FIG. 3C, the user may fine adjust, by dragging a lyrics selection bar 307, the lyrics selected by the user. A manner in which the user fine adjusts the selected favorite lyrics is not specifically limited in the present invention.

In another embodiment of the present invention, after step S204 is performed, and before S205 is performed, step S204-1 may be performed.

S204-1. Pre-play a segment that is associated with the displayed duration and of the music.

When the pre-played segment that is associated with the displayed duration and of the music satisfies a requirement of the user, an acquired segment that is confirmed by using a second gesture and of the music is the same as the pre-played segment of the music.

When the pre-played segment that is associated with the displayed duration and of the music does not satisfy a requirement of the user, the user fine adjusts the selected lyrics and fine adjusts the displayed time by using the fine adjustment option. In this case, an acquired segment that is confirmed by using a second gesture and of the music is different from the pre-played segment of the music.

By pre-playing the segment that is associated with the displayed duration and of the music, the user may determine, according to an effect of the pre-played segment of the music, whether to perform processing, which avoids trivial gesture steps brought to the user, where the trivial gesture steps are caused by repeated processing after the user is not satisfied with a processed part obtained by processing the music, thereby further improving user experience.

In another embodiment of the present invention, after step S204 is performed, and before S205 is performed, step S204-2 and step S204-3 may further be performed.

S204-2. Determine whether the part that is selected by using the first gesture and of the lyrics conforms to a preset syntax rule.

S204-3. Display recommended lyrics if the part that is selected by using the first gesture and of the lyrics does not conform to the preset syntax rule, where the recommended lyrics are lyrics that conform to the preset syntax rule.

Lyrics that conform to the preset syntax rule are recommended to the user by using a method of determining whether the part that is selected by using the first gesture and of the lyrics conforms to the preset syntax rule and displaying the recommended lyrics. When the user does not understand syntax of a language used in the lyrics of the played music, the mobile terminal may recommend, on the display screen according to the lyrics selected by the user, the lyrics that conform to the syntax rule. The user may obtain, according to the recommended lyrics that conform to the syntax rule, a segment that is confirmed by using a second gesture and of the lyrics. When the user is unfamiliar with a language of another country, the user may determine, in this manner, whether the part that is selected by using the first gesture and of the lyrics conforms to the preset syntax rule, and obtain, according to the recommended lyrics, a music segment associated with the recommended lyrics, which improves user experience.

S205. Receive a second gesture.

When the user thinks that play duration of the music that is associated with the part of the lyrics and displayed on the display screen is appropriate, the user inputs the second gesture. A segment of the played music is confirmed by using the second gesture, and play duration of the segment of the music may be equal to the displayed duration, or play duration of the segment of the music may be not equal to the displayed duration. For example, in a line of lyrics "You and I kiss goodbye~~" of Kiss Goodbye, lyrics selected by the user on the display screen are "You and I kiss goodbye", and duration corresponding to the lyrics is 4 seconds. However, a finally confirmed segment of the music is "You and I kiss goodbye~~", and duration of the segment is 4.6 seconds. Obviously, play duration of the segment of the music is greater than displayed duration.

As shown in FIG. 3B, for example, when the user thinks that duration of 9 seconds of music corresponding to the part "You and I kiss goodbye~~ in an empty street~ Let the wind laugh at that I cannot refuse" of the music Kiss Goodbye displayed on the display screen is appropriate, the user may tap a completion option 303.

S206. Acquire a segment that is confirmed by using the second gesture and of the media file.

When the display screen of the mobile terminal receives the second gesture of the user, where a segment of the music is confirmed by using the second gesture, play duration of the segment is associated with the displayed duration, and the mobile terminal captures the segment that is confirmed by using the second gesture and of the music, and saves the captured segment to a preset save path.

As shown in FIG. 3B, for example, when the user taps the completion option 303, the mobile terminal acquires a music segment corresponding to "You and I kiss goodbye~~ in an empty street~ Let the wind laugh at that I cannot refuse" selected by the user by using the first gesture.

In another embodiment of the present invention, after the user taps the completion option 303, a sharing option 304 is displayed on the processing interface. The sharing option 304 may provide the user with an option of sharing the acquired segment of the music with another user, so as to tell another friend that the user acquires the music segment corresponding to the lyrics "You and I kiss goodbye~~α in an empty street~ Let the wind laugh at that I cannot refuse" and to allow the another friend to set the acquired music segment that is shared with the another friend as a ring tone of a mobile terminal.

In another embodiment of the present invention, a statistical result of the music segment acquired by the user according to the selected lyrics may further be displayed on the display screen, for example, a quantity or a percentage of users who acquire, as the music segment, corresponding music according to the lyrics "You and I kiss goodbye~~ in an empty street~ Let the wind laugh at that I cannot refuse" that are selected by the users in Kiss Goodbye is displayed on the display screen.

The present invention provides a media file processing method. When playing music on a mobile terminal, a user inputs a gesture that triggers processing of the music, a music processing interface is displayed on the mobile terminal, and the user inputs a first gesture, where a part of lyrics is selected by using the first gesture, and duration of music associated with the part of the lyrics is displayed. The user inputs, according to the displayed duration, a second gesture to confirm a segment of the music. According to the selected lyrics of the music, a time corresponding to the selected part of the lyrics is displayed. The user acquires a favorite music segment according to the displayed duration, and the mobile terminal does not need to install other processing software to implement processing of a gesture, which reduces memory occupation and a resource occupied in a CPU inside the mobile terminal, and further reduces a burden of remembering a start time and an end time of favorite music by the user, thereby improving user experience.

Figure 4:
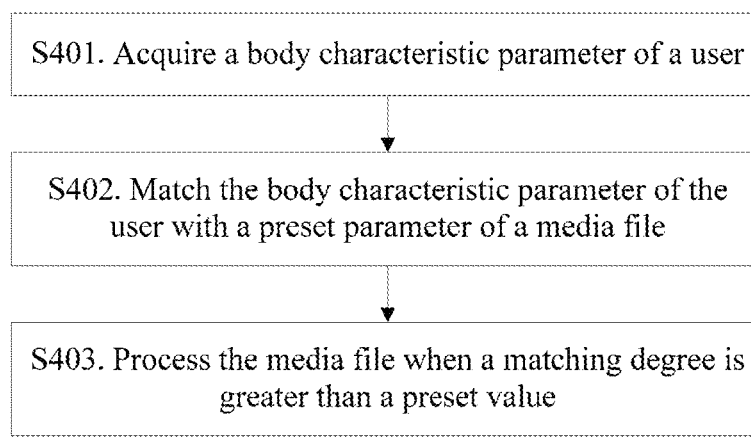
FIG. 4 is a flowchart of a media file processing method according to another embodiment of the present invention.

FIG. 4 is a flowchart of a media file processing method according to another embodiment of the present invention. As shown in FIG. 4, the method includes the following steps:

S401. Acquire a body characteristic parameter of a user.

The body characteristic parameter of the user may include a humming sound of the user, a speech sound of the user, volume of the user, a facial expression of the user, a hand motion regular pattern of the user, or the like. The body characteristic parameter of the user is not specifically limited in the present invention.

For example, a mobile terminal may acquire a music segment "You and I kiss goodbye~~ in an empty street~ Let the wind laugh at that I cannot refuse" that the user hums.

S402. Match the body characteristic parameter of the user with a preset parameter of the media file.

The parameter of the media file is preset on the mobile terminal, and for example, may be a segment of the media file, a tone of a sound in the media file, an emotion in the media file, or the like.

An example is used in which the media file is music whose song title is Kiss Goodbye. When the user plays Kiss Goodbye by using the mobile terminal, and when hearing some segments of Kiss Goodbye, the user is really fond of the segments, and cannot help humming. If, when the mobile terminal plays "You and I kiss goodbye~~ in an empty street~ Let the wind laugh at that I cannot refuse", the user hums along with "You and I kiss goodbye~~ in an empty street~ Let the wind laugh at that I cannot refuse".

The mobile terminal matches the acquired music segment "You and I kiss goodbye~~ in an empty street~ Let the wind laugh at that I cannot refuse" that the user hums with the music segment "You and I kiss goodbye~~ in an empty street~ Let the wind laugh at that I cannot refuse" in the music Kiss Goodbye.

S403. Process the media file when a matching degree is greater than a preset value.

The music Kiss Goodbye is still used as an example. When the mobile terminal determines that a matching degree between the acquired music segment "You and I kiss goodbye~~ in an empty street~ Let the wind laugh at that I cannot refuse" that the user hums and the music segment "You and I kiss goodbye~~ in an empty street~ Let the wind laugh at that I cannot refuse" in the music Kiss Goodbye is greater than 80%, the mobile terminal acquires the music segment "You and I kiss goodbye~~ in an empty street~ Let the wind laugh at that I cannot refuse" in the played music Kiss Goodbye.

The present invention provides a media file processing method. When a user plays music on a mobile terminal, a body characteristic parameter of the user is acquired, the body characteristic parameter of the user is matched with a preset parameter of a media file, and the media file is processed when a matching degree is greater than a preset value. The mobile terminal processes the music according to the matching degree between the body characteristic parameter of the user and the preset parameter of the media file. The mobile terminal does not need to install other processing software to implement processing of a gesture, which reduces memory occupation and a resource occupied in a CPU inside the mobile terminal, and further reduces a burden of remembering a start time and an end time of favorite music by the user, thereby improving user experience.

Figure 5:
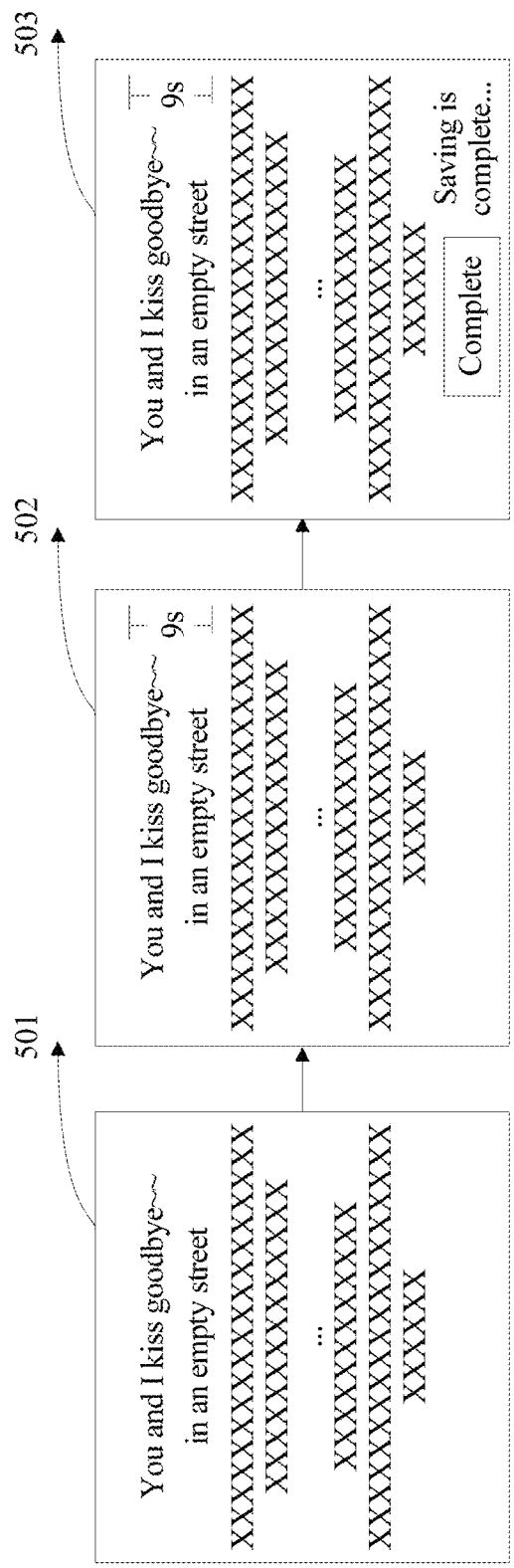
FIG. 5 is a diagram of a graphical user interface for processing a media file according to an embodiment of the present invention.

FIG. 5 is a diagram of a graphical user interface for processing a media file according to an embodiment of the present invention. As shown in FIG. 5, text information 501 is displayed.

A first interface 502 is displayed in response to a first gesture, where the first interface displays time information and a part that is selected by using the first gesture and of the text information, and the time information is associated with the part that is selected by using the first gesture and of the text information.

A second interface 503 is displayed in response to a second gesture, where the second interface displays an acquired segment that is confirmed by using the second gesture and of the media file.

Figure 6:
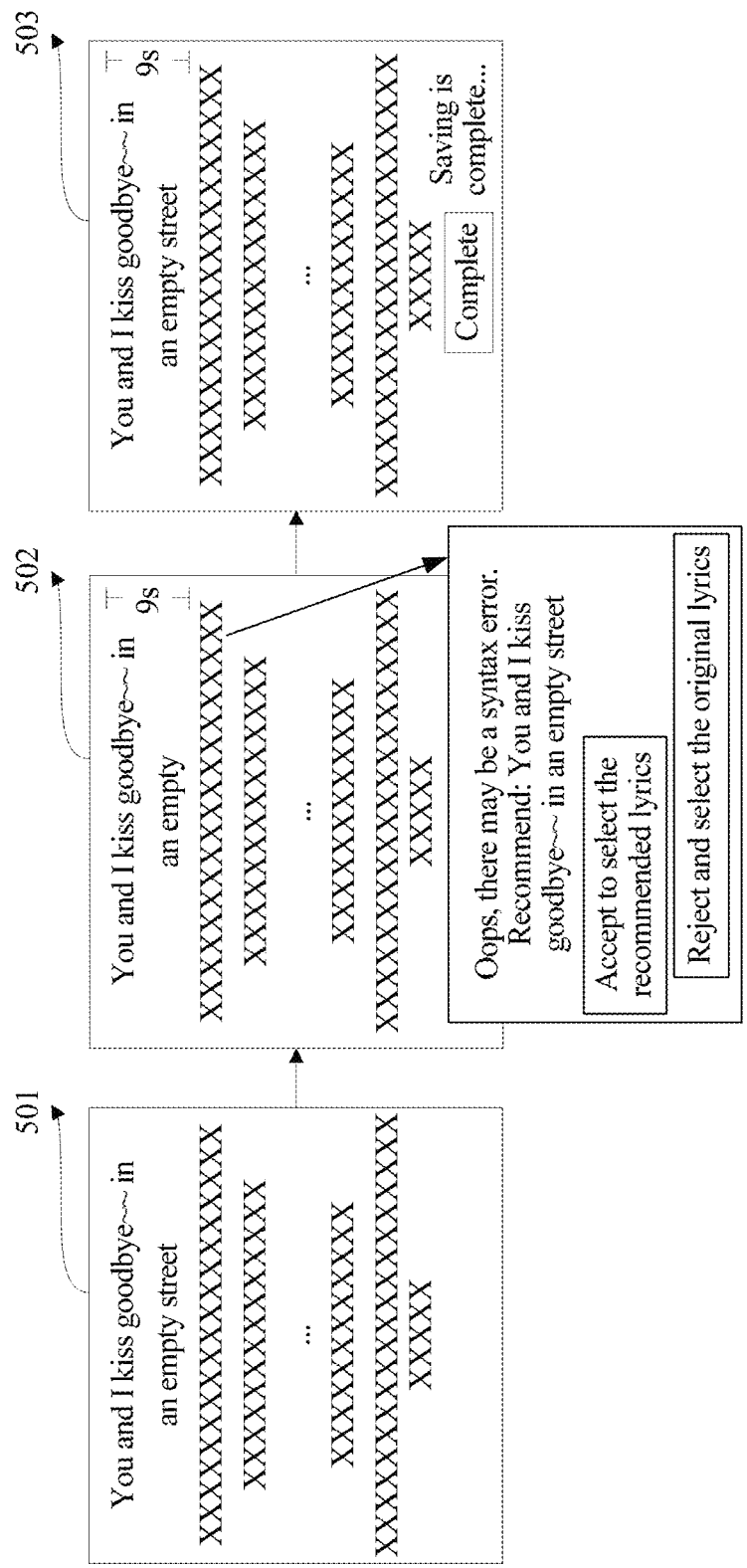
FIG. 6 is a diagram of a graphical user interface for processing a media file according to another embodiment of the present invention.

In another embodiment of the present invention, recommended information is displayed on the displayed first interface 502, where the recommended information is text information that conforms to the preset syntax rule. As shown in FIG. 6, after the time information and the part that is selected by using the first gesture and of the text information are displayed on the first interface 502, the recommended information is displayed on the interface 502. Kiss Goodbye is used as an example; a terminal determines whether a part "You and I kiss goodbye~~ in an empty" that is selected by using the first gesture and of the lyrics conforms to the preset syntax rule.

If the part that is selected by using the first gesture and of the lyrics does not conform to the preset syntax rule, that is, "You and I kiss goodbye~~ in an empty" does not conform to the preset syntax rule, the recommended information is displayed. As shown on the interface 502 in FIG. 6, "You and I kiss goodbye~~ in an empty street" is recommended.

Figure 7:
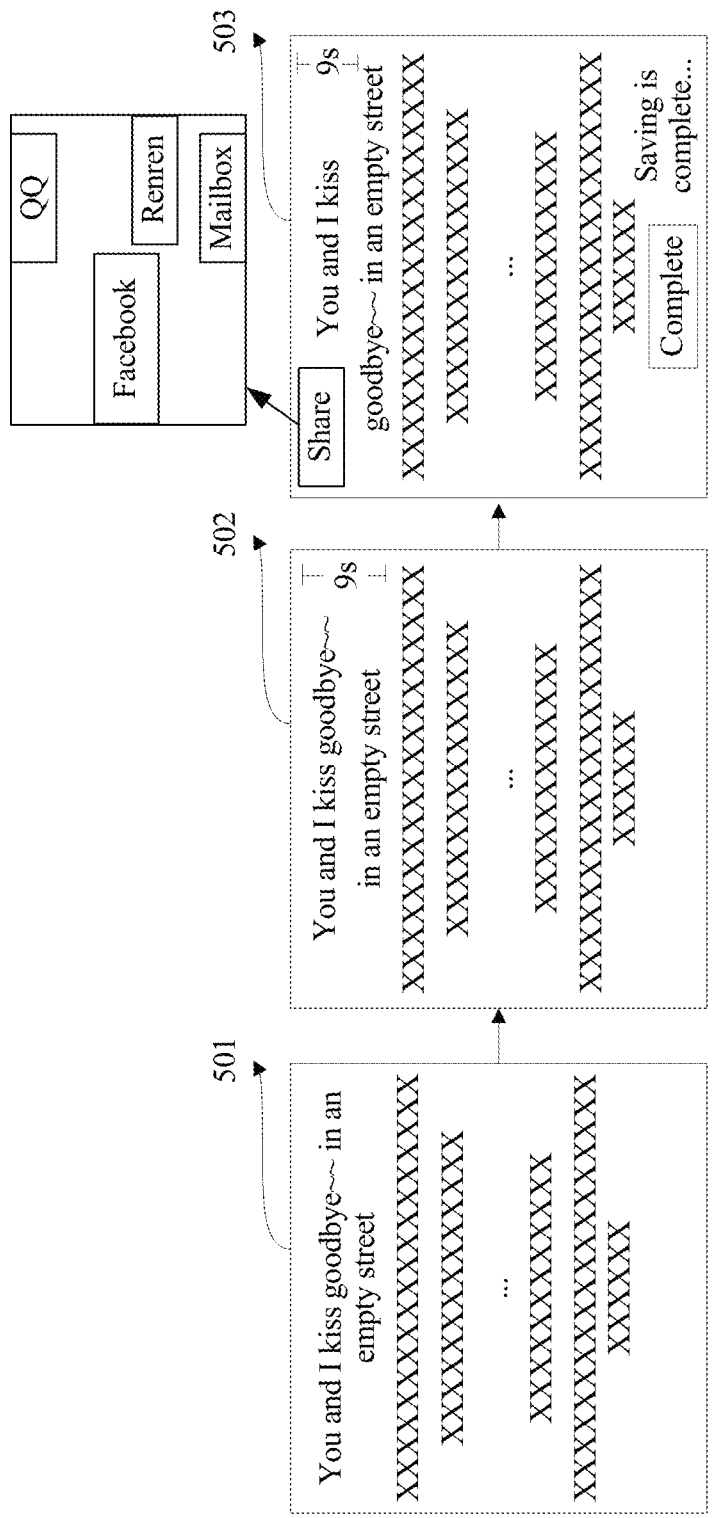
FIG. 7 is a diagram of a graphical user interface for processing a media file according to another embodiment of the present invention.

In another embodiment of the present invention, a sharing option is displayed on the displayed second interface 503, where the sharing option responds to a third gesture, so that the acquired segment of the media file is shared. As shown in FIG. 7, the sharing option is displayed on the second interface 503, and the sharing option provides a user with an option of performing sharing with another user in another communication manner, so that an acquired segment of the music can be shared.

A fine adjustment option is further displayed on the displayed first interface 502, where the fine adjustment option provides an option of fine adjusting the part that is selected by using the first gesture and of the text information, or the fine adjustment option provides an option of fine adjusting the displayed time information.

This embodiment of the present invention provides a graphical user interface that is configured to display a user interface for processing a media file, and the graphical user interface may further implement the foregoing media file processing methods of the present invention, and is not limited to the embodiment of the graphical user interface of the present invention.

In this embodiment of the present invention, a graphical user interface for processing a media file is provided. A user may input a first gesture of the user on the graphical user interface for processing a media file, and time information associated with the text information is displayed according to a part that is selected by the user and of text information. The user inputs, according to the displayed time information, a second gesture, and acquires a favorite music segment. A mobile terminal that provides the graphical user interface does not need to install other processing software to implement processing of a gesture, which reduces memory occupation and a resource occupied in a CPU inside the mobile terminal, and further reduces a burden of remembering a start time and an end time of favorite music by the user, thereby improving user experience. Further, the graphical user interface for processing a media file provides, in a user-friendly manner, diversified visual gesture buttons for the user, which improves efficiency of a graphical interface in processing a media file by using a user gesture, and user experience.

Figure 8:
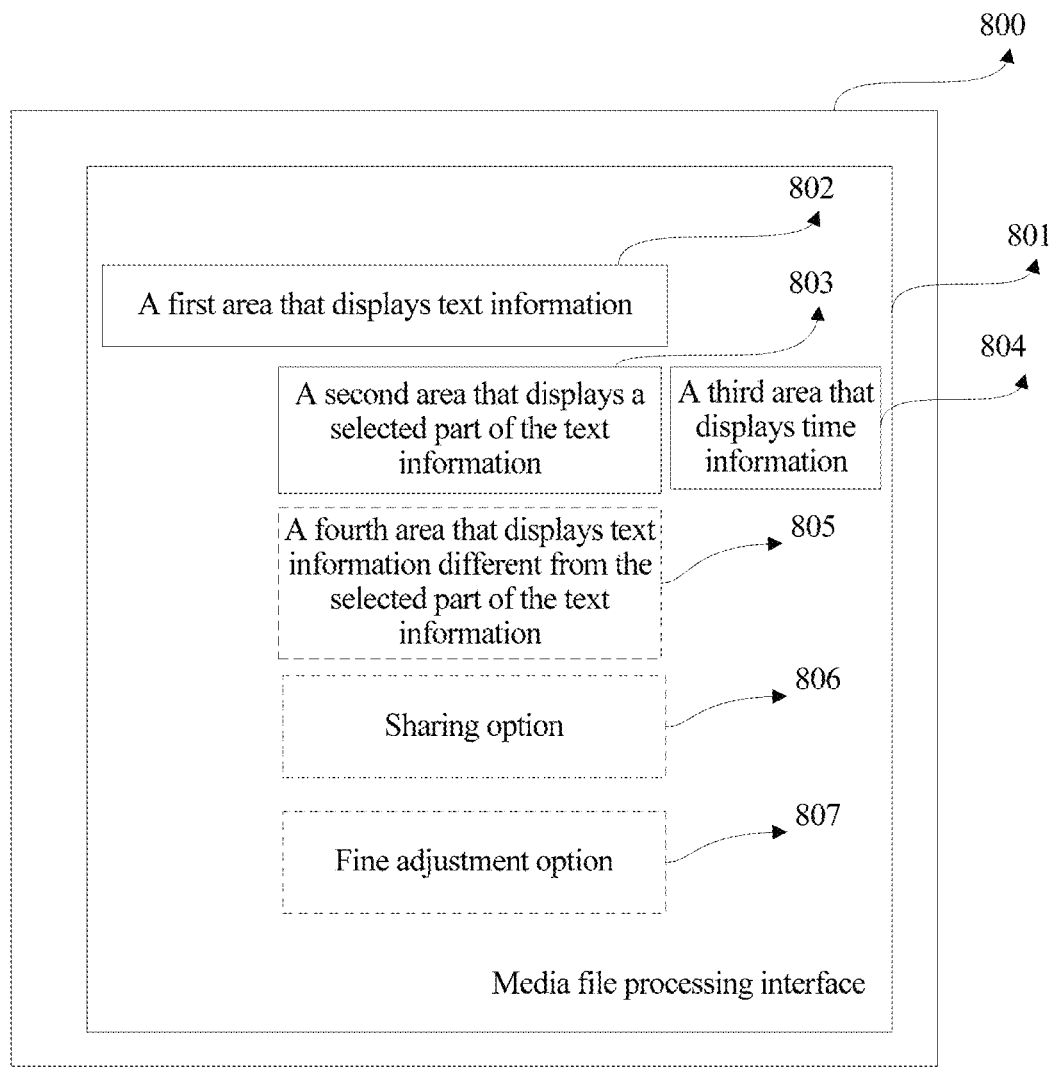
FIG. 8 is a diagram of a graphical user interface for processing a media file according to another embodiment of the present invention.

FIG. 8 shows a graphical user interface 800 on a mobile terminal device according to another embodiment of the present invention, where the graphical user interface includes a media file processing interface 801.

The media file processing interface 801 includes a first area 802 that displays text information, a second area 803 that displays a selected part of the text information, and a third area 804 that displays time information.

Text information that is associated with the media file is displayed in the first area 802 of the text information.

In response to a received first gesture, the second area 803 of the selected part of the text information is displayed, where the part of the text information displayed in the first area of the text information is selected by using the first gesture.

The time information that is associated with the part that is selected by using the first gesture and of the text information is displayed in the third area 804 that displays the time information.

In response to a received second gesture, a segment that is confirmed by using the second gesture and of the media file is acquired, where the segment of the media file is confirmed by using the second gesture, and play duration of the segment is associated with the displayed time information.

In another embodiment of the present invention, the graphical user interface 801 further includes a fourth area 805 that displays text information different from the selected part of the text information, recommended information is displayed in the fourth area that is different from the selected part of the text information, and the recommended information is text information that conforms to the preset syntax rule.

In another embodiment of the present invention, the graphical user interface 801 further includes a sharing option 806, where the sharing option responds to a third gesture, so that the acquired segment of the media file is shared.

In another embodiment of the present invention, a fine adjustment option 807 is displayed, where the fine adjustment option provides an option of fine adjusting the part that is selected by using the first gesture and of the text information, or the fine adjustment option provides an option of fine adjusting the displayed time information.

This embodiment of the present invention provides a graphical user interface that is configured to display a user interface for processing a media file, and the graphical user interface may further implement the foregoing media file processing methods of the present invention, and is not limited to the embodiment of the graphical user interface of the present invention.

In this embodiment of the present invention, a graphical user interface for processing a media file is provided. A user may input a first gesture of the user on the graphical user interface for processing a media file, and according to a part that is selected by the user and of text information, time information associated with the text information is displayed. The user inputs, according to the displayed time information, a second gesture, and acquires a favorite music segment. A mobile terminal that provides the graphical user interface does not need to install other processing software to implement processing of a gesture, which reduces memory occupation and a resource occupied in a CPU inside the mobile terminal, and further reduces a burden of remembering a start time and an end time of favorite music by the user, thereby improving user experience. Further, the graphical user interface for processing a media file provides, in a user-friendly manner, diversified visual gesture buttons for the user, which improves efficiency of a graphical interface in processing a media file by using a user gesture, and user experience.

Figure 9:
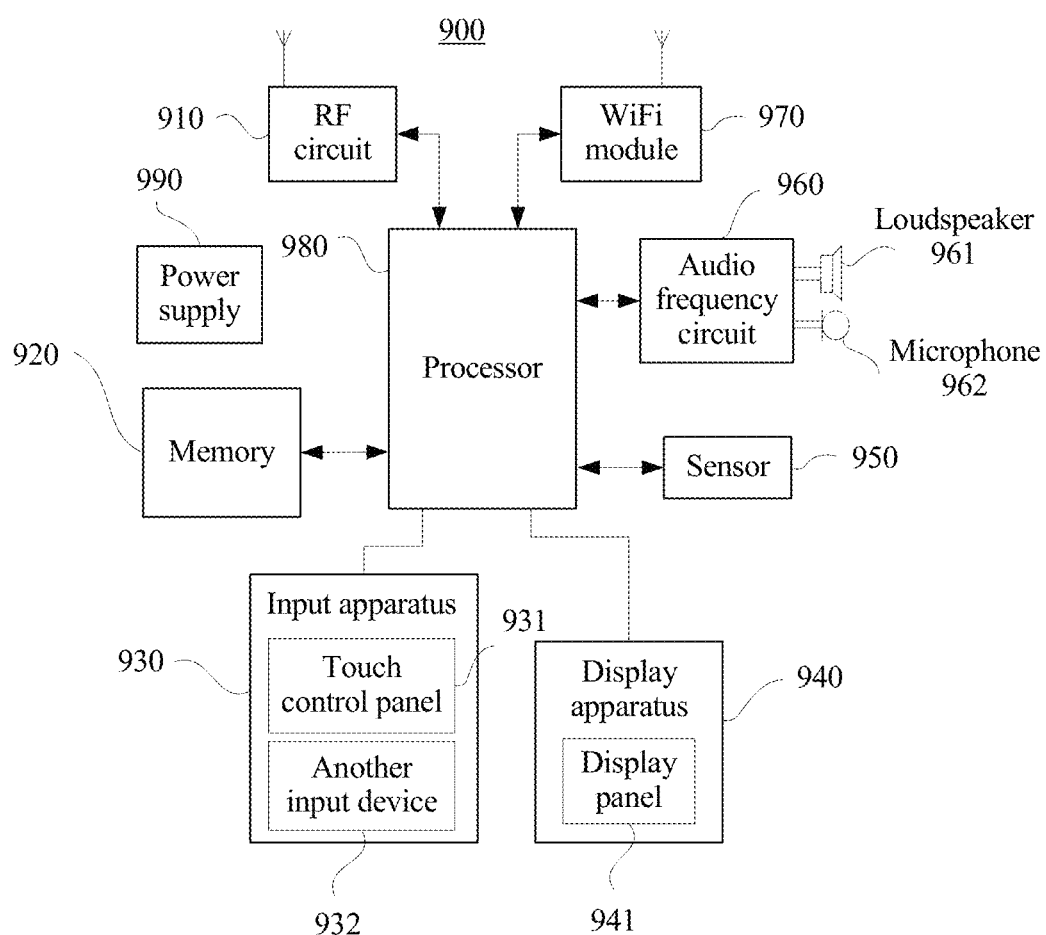
FIG. 9 shows a media file processing terminal 900 according to an embodiment of the present invention.

FIG. 9 shows a media file processing terminal 900 according to an embodiment of the present invention. The terminal 900 may be configured to perform the foregoing methods in the embodiments of the present invention. As shown in FIG. 9, the terminal 900 may be a terminal device that includes a mobile phone, a tablet computer, a PDA (personal digital assistant), a POS (point of sale), a vehicle-mounted computer, and the like. The terminal 900 includes parts such as an RF (radio frequency) circuit 910, a memory 920, an input apparatus 930, a display apparatus 940, a sensor 950, an audio frequency circuit 960, a WiFi (Wireless Fidelity) module 970, a processor 980, and a power supply 990. Persons killed in the art may understand that a structure of the terminal shown in FIG. 9 is merely used as an example of an implementation manner, does not constitute a limitation on a mobile phone, and may include parts more or fewer than those shown in the figure, or a combination of some parts, or different part arrangements.

The radio frequency circuit 910 may be configured to receive and send a signal in an information receiving or sending process or a call process, and in particular, after receiving downlink information of a base station, send the downlink information to the processor 980 for processing; and in addition, send relevant uplink data to the base station. Generally, the radio frequency circuit 910 includes but is not limited to an antenna, at least one amplifier, a transceiver, a coupler, an LNA (low noise amplifier), a duplexer, and the like. In addition, the radio frequency circuit 910 may further communicate with a network and another device by means of radio communications. The radio communications may use any communication standard or protocol, including but not being limited to GSM (Global System of Mobile communication), GPRS (General Packet Radio Service), CDMA (Code Division Multiple Access), WCDMA (Wideband Code Division Multiple Access), LTE (Long Term Evolution), email, SMS (Short Messaging Service), and the like.

The memory 920 may be configured to store a software program and a module, and the processor 980 executes various functional applications of the terminal 900 and data processing by running the software program and the module stored in the memory 920. The memory 920 may mainly include a program storage area and a data storage area, where the program storage area may store an operating system, an application program (such as a sound playing function or an image playing function) that is required by at least one function, and the like; and the data storage area may store data (such as audio data or a phonebook) that is created according to use of the terminal 900, and the like. In addition, the memory 920 may include a high-speed random access memory, and may further include a non-volatile memory, for example, at least one magnetic disk storage device, a flash device, or another volatile solid-state storage device.

The display apparatus 940 may be configured to display information input by a user or information provided for the user, and various menus of the mobile phone 900. The display apparatus 940 may include a display panel 941, and optionally, the display panel 941 may be configured in a form of an LCD (liquid crystal display), an OLED (organic light-emitting diode), and the like. Further, a touch control panel 931 may cover the display panel 941. When detecting a touch operation on or near the touch control panel 931, the touch control panel 931 transmits the touch operation to the processor 980 to determine a type of a touch event, and then the processor 980 provides corresponding visual output on the display panel 941 according to the type of the touch event. Although in FIG. 9, the touch control panel 931 and the display panel 941 are used as two independent parts to implement an input and input function of the terminal 900, in some embodiments, the touch control panel 931 and the display panel 941 may be integrated to implement the input and output function of the terminal 900. For example, the touch control panel 931 and the display panel 941 may be integrated into a touchscreen to implement the input and output function of the terminal 900.

The terminal 900 may further include at least one type of sensor 990, such as a light sensor, a motion sensor, and another sensor. Specifically, the light sensor may include an ambient light sensor and a proximity sensor, where the ambient light sensor may adjust luminance of the display panel 941 according to brightness or dimness of ambient light, and the proximity sensor may disable the display panel 941 or turn off backlight when the terminal 900 moves to an ear. As a type of motion sensor, an accelerometer sensor may detect an acceleration value in each direction (generally three axes), may detect a value and a direction of gravity when the mobile phone is static, and may be applied to an application for recognizing a mobile phone posture (for example, a switch between landscape and portrait screens, a relevant game, and magnetometer posture calibration), and have a function related to vibration recognition (such as a pedometer or a knock), and the like. Other sensor such as a gyroscope, a barometer, a hygrometer, a thermometer, or an infrared sensor may also be disposed on the mobile phone 900, which is not described herein.

The audio frequency circuit 960, a loudspeaker 961, and a microphone 962 can provide an audio interface between the user and the terminal 900. The audio frequency circuit 960 may transmit, to the loudspeaker 961, a received electrical signal obtained after audio data conversion, and the loudspeaker 961 converts the electrical signal to a sound signal for output. In another aspect, the microphone 962 converts a collected sound signal to an electrical signal, the audio frequency circuit 960 receives the electrical signal, converts the electrical signal to audio data, and outputs the audio data to the processor 980 for processing, the processor 980 processes the audio data and sends the processed audio data to another mobile phone by using the radio frequency circuit 910, or the processor 980 outputs the audio data to the memory 920 for further processing.

The terminal 900 may help, by using the WiFi module 970, a user receive and send an email, browse a web page, access streaming media, and so on, and provides the user with wireless broadband Internet access. Although FIG. 9 shows the WiFi module 970, it may be understand that the WiFi module 970 is not a mandatory part of the terminal 900, and may completely be omitted according to a need without changing the essence of the present invention.

The processor 980 is a control center of the terminal 900, connects all parts of the entire mobile phone by using various interfaces and lines, and executes various functions of the mobile phone 900 and data processing by running or executing the software program and/or the module that are/is stored in the memory 920 and by invoking data stored in the memory 920, so as to perform overall monitoring on the terminal. Optionally, the processor 980 may include one or more processing units. Preferably, an application processor and a modem processor may be integrated into the processor 980, where the application processor mainly processes an operating system, a user interface, an application program, and the like; and the modem processor mainly processes radio communications. It may be understood that the foregoing modem processor may not be integrated into the processor 980. The processor 980 may be specifically a central processing unit (CPU).

The terminal 900 further includes the power supply 990 (such as a battery) that supplies power to the parts. Preferably, the power supply may be logically connected to the processor 980 by using a power management system, so that functions such as charging and discharging management, and power consumption management are implemented by using the power management system.

In this embodiment of the present invention, the input apparatus 930, the display apparatus 940, and the processor 980 that are included in the mobile terminal 900 have the following functions.

The display apparatus 940 is configured to: display text information, where the text information is associated with the media file; and display time information, where the time information is associated with a part that is selected by using the first gesture and of the text information.

The input apparatus 930 is configured to: receive the first gesture, where the part of the displayed text information is selected by using the first gesture; and receive a second gesture, where a segment of the media file is confirmed by using the second gesture, and play duration of the segment is associated with the displayed time information.

The processor 980 is further configured to acquire the segment that is confirmed by using the second gesture and of the media file.

In another embodiment of the present invention, that the processor 980 acquires the segment that is confirmed by using the second gesture and of the media file specifically includes: the processor 980 captures the segment that is confirmed by using the second gesture and of the media file, and saves the captured segment to a preset save path.

In another embodiment of the present invention, after the input apparatus 930 receives the first gesture, the processor 980 determines whether the part that is selected by using the first gesture and of the text information conforms to a preset syntax rule.

In another embodiment of the present invention, the display apparatus 940 displays recommended information if the part that is selected by using the first gesture and of the text information does not conform to the preset syntax rule, where the recommended information is text information that conforms to the preset syntax rule.

In another embodiment of the present invention, the display apparatus 940 displays a sharing option after the processor 980 acquires the segment that is confirmed by using the second gesture and of the media file, where the sharing option responds to a third gesture, so that the acquired segment of the media file is shared.

In another embodiment of the present invention, before the second gesture is received, the processor 980 pre-plays the segment that is associated with the displayed time information and of the media file.

In another embodiment of the present invention, before the second gesture is received, the display apparatus 940 displays a fine adjustment option, where the fine adjustment option provides an option of fine adjusting the part that is selected by using the first gesture and of the text information, or the fine adjustment option provides an option of fine adjusting the displayed time information.

In this embodiment of the present invention, a media file processing terminal is provided. The terminal selects a part of text information according to a first gesture of a user, and the mobile terminal displays time information associated with the text information. The user inputs, according to the displayed time information, a second gesture, and acquires a favorite music segment. The terminal does not need to install other processing software to implement processing of a gesture, which reduces memory occupation and a resource occupied in a CPU inside the mobile terminal, and further reduces a burden of remembering a start time and an end time of favorite music by the user, thereby improving user experience. Further, a graphical user interface for processing a media file provides, in a user-friendly manner, diversified visual gesture buttons for the user, which improves efficiency of a graphical interface in processing a media file by using a user gesture, and user experience.

Persons of ordinary skill in the art may be aware that, in combination with the examples described in the embodiments disclosed in this specification, units, algorithms and method steps may be implemented by a combination of computer software and electronic hardware. Whether the functions are performed by hardware or software depends on particular applications and design constraint conditions of the technical solutions. Persons skilled in the art may use different methods to implement the described functions for each particular application, but it should not be considered that the implementation goes beyond the scope of the present invention.

It may be clearly understood by persons skilled in the art that, for the purpose of convenient and brief description, the foregoing mobile terminal and access terminal separately perform a working process in the described method embodiments of the present invention; and for specific working, reference may be made to a corresponding process in the foregoing method embodiments, and details are not described herein.

In the several embodiments provided in the present application, the disclosed server and method may be implemented in other manners. For example, the described server embodiment is merely exemplary. For example, the unit division is merely logical function division and may be other division in actual implementation. For example, a plurality of units or components may be combined or integrated into another system, or some features may be ignored or not performed. In addition, the displayed or discussed mutual couplings or direct couplings or communication connections may be implemented by using some interfaces. The indirect couplings or communication connections between the apparatuses or units may be implemented in electronic, mechanical, or other forms.

The units described as separate parts may or may not be physically separate, and parts displayed as units may or may not be physical units, may be located in one position, or may be distributed on a plurality of network units. A part or all of the units may be selected according to actual needs to achieve the objectives of the solutions of the embodiments of the present invention.

In addition, functional units in the embodiments of the present invention may be integrated into one processing unit, or each of the units may exist alone physically, or two or more units are integrated into one unit.

Persons of ordinary skill in the art may understand that all or some of the steps of the method embodiments may be implemented by a program instructing relevant hardware. The program may be stored in a computer readable storage medium. When the program runs, the steps of the method embodiments are performed. The foregoing storage medium includes: any medium that can store program code, such as a read-only memory (ROM), a random access memory (RAM), a magnetic disk, or an optical disc.

The foregoing descriptions are merely specific implementation manners of the present invention, but are not intended to limit the protection scope of the present invention. Any variation or replacement readily figured out by persons skilled in the art within the technical scope disclosed in the present invention shall fall within the protection scope of the present invention. Therefore, the protection scope of the present invention shall be subject to the protection scope of the claims. Additionally, statements made herein characterizing the invention refer to an embodiment of the invention and not necessarily all embodiments.

What is claimed is:

1. An electronic device, comprising:
an input apparatus;
a display apparatus; and
a processor;
wherein:
the display apparatus is configured to display a first interface showing a name of a song being currently played by the electronic device, an entire play time of the song, a current play position of the song, and lyrics of the song;
the input apparatus is configured to receive a first gesture via the first interface;
the display apparatus is further configured to, in response to the first gesture, display a second interface showing the lyrics and a completion option, wherein the entire play time of the song is not shown on the second interface;
the input apparatus is further configured to receive a second gesture via the second interface;
the display apparatus is further configured to, in response to the second gesture, display a first part of the lyrics as being selected, wherein a second part of the lyrics is displayed as being unselected, a first selection bar is displayed at a first end of the first part and is movable by dragging, and a second selection bar is displayed at a second end of the first part and is movable by dragging;
the input apparatus is further configured to receive a tap gesture on the completion option being displayed on the second interface; and
the processor is configured to, in response to the tap gesture, confirm a music segment of the song being currently played, wherein the music segment is associated with the first part, and a play duration and a statistical result of the music segment is displayed.

2. An electronic device, comprising:
a display, wherein the display comprises a touch-sensitive surface and a screen;
one or more processors;
a memory having processor-executable instructions stored thereon, wherein the processor-executable instructions, when executed by the one or more processors, facilitate:
displaying a first interface showing a name of a song being currently played by the electronic device, an entire play time of the song, a current play position of the song, and lyrics of the song;
receiving a first gesture via the first interface;
in response to the first gesture, displaying a second interface showing the lyrics and a completion option, wherein the entire play time of the song is not shown on the second interface;
receiving a second gesture via the second interface;
in response to the second gesture, displaying a first part of the lyrics as being selected, wherein a second part of the lyrics is displayed as being unselected, a first selection bar is displayed at a first end of the first part and is movable by dragging, and a second selection bar is displayed at a second end of the first part and is movable by dragging;
receiving a tap gesture on the completion option being displayed on the second interface; and
in response to the tap gesture, confirming a music segment of the song being currently played, wherein the music segment is associated with the first part, and a play duration and a statistical result of the music segment is displayed.

3. The electronic device according to claim 2, wherein the first interface and the second interface belong to a same application.

4. The electronic device according to claim 2, wherein the first part conforms to a preset syntax rule.

5. The electronic device according to claim 2, wherein the processor-executable instructions, when executed, further facilitate:
displaying recommendation information if the first part does not conform to a preset syntax rule, wherein the recommendation information is text information that conforms to the preset syntax rule.

6. The electronic device according to claim 2, wherein the processor-executable instructions, when executed, further facilitate:
displaying a sharing option after the music segment is confirmed.

7. The electronic device according to claim 2, wherein the processor-executable instructions, when executed, further facilitate:
playing the music segment.

8. The electronic device according to claim 2, wherein the processor-executable instructions, when executed, further facilitate:
before the tap gesture is received, displaying an adjustment option for adjusting the play duration of the music segment.

9. The electronic device according to claim 2, wherein the processor-executable instructions, when executed, further facilitate:
saving the music segment to a preset save path of the electronic device.

10. The electronic device according to claim 2, wherein the second interface does not show the entire play time and playing control items.

11. A non-transitory computer-readable storage medium having processor-executable instructions stored thereon, wherein the processor-executable instructions, when executed by an electronic device, facilitate:
displaying a first interface showing a name of a song being currently played by the electronic device, an entire play time of the song, a current play position of the song, and lyrics of the song;
receiving a first gesture via the first interface;
in response to detecting the first gesture, displaying a second interface showing the lyrics and a completion option, wherein the entire play time of the song is not shown on the second interface;
receiving a second gesture via the second interface;
in response to detecting the second gesture, displaying a first part of the lyrics as being selected, wherein a second part of the lyrics is displayed as being unselected, a first selection bar is displayed at a first end of the first part and is movable by dragging, and a second selection bar is displayed at a second end of the first part and is movable by dragging;
receiving a tap gesture on the completion option; and
in response to detecting the tap gesture, confirming a music segment of the song being currently played, wherein the music segment is associated with the first part, and a play duration and a statistical result of the music segment is displayed.

12. The non-transitory computer-readable storage medium of claim 11, wherein the first interface and the second interface belong to a same application.

13. The non-transitory computer-readable storage medium of claim 11, wherein the processor-executable instructions, when executed, further facilitate:
displaying a sharing option after the music segment is confirmed.

14. The non-transitory computer-readable storage medium of claim 11, wherein the processor-executable instructions, when executed, further facilitate:
playing the music segment.

15. The non-transitory computer-readable storage medium of claim 11, wherein the processor-executable instructions, when executed, further facilitate:
before the tap gesture is received, displaying an adjustment option for adjusting the play duration of the music segment.

16. The non-transitory computer-readable storage medium of claim 11, wherein the processor-executable instructions, when executed, further facilitate:
saving the music segment to a preset save path of the electronic device.

17. The non-transitory computer-readable storage medium of claim 11, wherein the second interface does not show the entire play time and playing control items.

* * * * *